Aug. 29, 1933.   L. M. PATTERSON, JR   1,924,959
STORAGE BATTERY APPARATUS
Filed Dec. 24, 1930
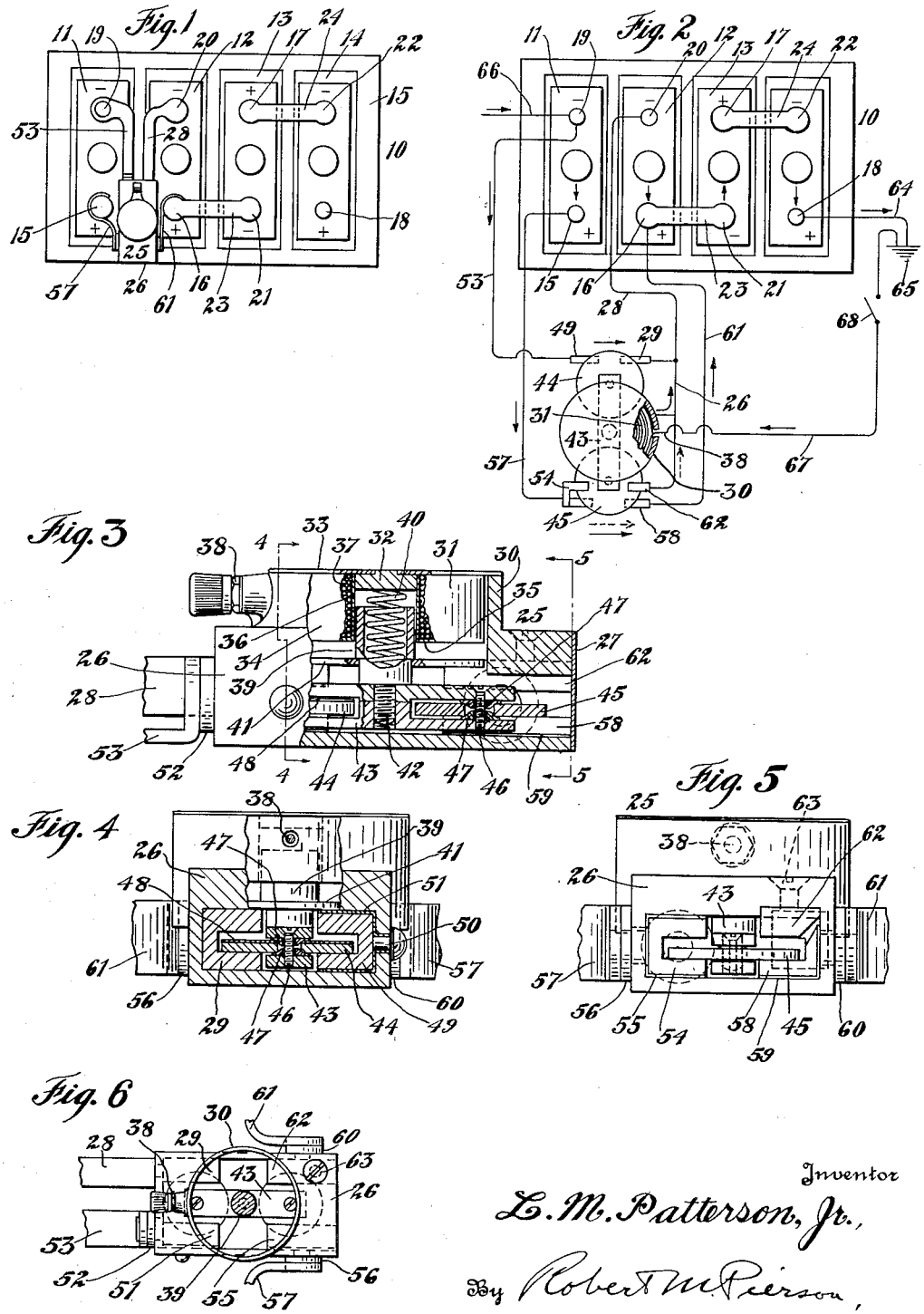

Patented Aug. 29, 1933

1,924,959

UNITED STATES PATENT OFFICE 1,924,959

STORAGE BATTERY APPARATUS

Luther M. Patterson, Jr., New Philadelphia, Ohio

Application December 24, 1930
Serial No. 504,556

7 Claims. (Cl. 171—314)

This invention relates to electrical starting, lighting and ignition batteries for internal-combustion automotive engines. It has for its principal object to provide a storage battery and switch combination and method whereby the battery may be charged with the normal voltage for which the system is designed, but additional discharge voltage and power may be applied to the starting motor whenever desired.

A further object is to provide an improved, portable battery and switch unit, especially one in which the switch is adapted for remote control, capable of substitution for the regular starting and lighting battery.

When an automobile has stood in a cold atmosphere for a long time, the battery cell voltage is reduced below normal and will neither afford the usual engine-cranking power nor the usual spark temperatures for engine ignition. Furthermore, the fuel will not vaporize readily at low temperatures and the lubricating oil in the engine is so stiffened that an abnormal amount of power is required to crank the engine at the very time when less than the normal amount of battery power is available. The combination of these factors produces many starting failures, which can be avoided by the use of my improvements.

The present invention, by way of illustration, provides an extra-cell battery and a series-parallel switch combined as a unit which may be substituted for the regular battery in an ordinary six-volt system at a small additional cost. The improved battery is charged in the ordinary manner and can be used for starting in the usual way, or, with no more added trouble than throwing the switch it may be employed for a start with extra power whenever desired. This result, so far as I am aware, has never been attained prior to my invention in spite of the long-standing need and knowledge among battery engineers that even one extra cell temporarily connected in series with the regular battery will furnish the necessary added power.

Of the accompanying drawing, Fig. 1 is a plan view showing a combined storage battery and switch apparatus embodying my invention in a preferred form.

Fig. 2 is a plan view, partly in section, showing the battery, switch and circuit connections, partly in diagram.

Fig. 3 is a side elevation of the switch, partly in section.

Fig. 4 is a section on the line 4—4 of Fig. 3, partly in elevation.

Fig. 5 is an end elevation from the plane 5—5 of Fig. 3.

Fig. 6 is a plan view of the switch, partly in section and without the magnet bobbin.

Referring to the drawing, 10 is a storage battery adapted for use in a six-volt starting, lighting and ignition system, and comprising a block of four cells 11, 12, 13 and 14, arranged in a row and occupying the compartments of a unit container 15 having the usual integral partitions between the cells. The positive terminals of the several cells are indicated at 15, 16, 17 and 18 and marked with the plus sign, while the negative terminals are indicated at 19, 20, 21 and 22 and marked with the minus sign. The three cells 12, 13 and 14 have their terminals of opposite signs disposed on opposite sides of the battery in alternate cells and the intermediate terminals integrally joined by lead straps or bridges 23, 24 to permanently connect these three cells in series in the usual manner. The positive terminals 15, 16 of the two cells 11 and 12, however, are located on the same side of the battery and their negative terminals 19, 20 are located on the opposite side, these two cells constituting a sub-group within the main cell group for connection alternatively in parallel and series arrangement.

In order that the size of the battery shall not be substantially increased over that of the one which it is to replace, I prefer to employ approximately the same total number of plates but divide them into four instead of three equal or substantially equal groups. Thus, to replace an ordinary three-cell battery of fifteen plates per cell or a total of forty-five plates, I may employ eleven plates in each of the four cells, giving a total forty-four plates. To replace a battery having seventeen plates per cell or a total of fifty-one, I may employ four cells having thirteen plates each or a total of fifty-two. To replace a three-cell battery of nineteen plates per cell or a total of fifty-seven, I may employ four cells of fifteen plates each or a total of sixty.

The series-parallel switch device, designated generally at 25, is mounted on top of the cell block at one side of the battery and overlaps the two cells 11 and 12. While its movable switch contacts could be directly thrown by manual operation I prefer to provide remote or relay control through an electromagnet and a local push-button switch placed in any convenient position, such as on the instrument board or steering post of the automobile, substantially as hereinafter described.

The switch device 25 includes a casing 26 mounted on the battery container 15 and permanently associated with the battery by means of external lead connectors fused to the posts of the cells 11 and 12. Said casing, containing the magnet and switch mechanism, should be sealed to protect the inner parts against the entrance of corrosive or other foreign substances, and its external surfaces should be immune to the battery acid. I prefer to cast the casing body in a single piece of lead, with an opening in its right-hand end as viewed in Fig. 3, for the insertion of certain of the fixed contacts and the movable contact assembly after the casting is made, said opening being then closed by a lead plate 27 burned to the casing body. An external lead strap 28 for connection with the negative terminal 20 of cell 12 is cast integral with the casing 26, and a U-shaped copper contact piece 29 is embedded in one corner of the casing 26 as indicated in Fig. 4, at the time said casing is cast.

Casing 26 is also formed with an upward extension 30 surrounding a central opening leading to the main chamber, for the reception of the switch-operating magnet and its armature. 31 designates the wire-wound magnet bobbin secured, by a short magnetic core-piece 32 in the upper end of the central aperture of said body, to a magnetic top plate 33 whose margins overlie the casing extension 30 to support the magnet thereon. This top plate 33 may be lead covered and burned to the switch casing. The bobbin 31 may further have an outer magnetic sleeve 34, a non-magnetic bottom plate 35 and a non-magnetic liner sleeve 36. The outer end of the magnetic winding 37 is connected with an external binding post 38 on the switch casing, and its inner end is provided with a local ground upon the metal parts of the bobbin 31 and therethrough to the switch casing 26, which acts as a conductor in the battery circuit as hereinafter pointed out.

The magnet in this case is a semi-solenoid and provided with a vertically-movable, hollow-core armature member 39 between the bottom of which and the fixed core-piece 32 is interposed a helical spring 40 for assisting the action of gravity in depressing said core 39 and its connected movable contact assembly. Surrounding the reduced lower portion of the core 39 is a circular magnetic armature plate 41 which normally rests on the fixed contacts 29, 62 and the insulation 51, 55 whose corners are shown projecting within the circle of the casing member 30 in Fig. 4. When the magnet is energized, plate 41 is drawn upwardly and, acting against the shoulder at the upper end of said reduced portion, it assists in producing an abrupt break of the switch contacts.

Upon a threaded stem 42 projecting from the lower end of the armature core member 39 is screwed a movable contact holder 43 in the form of a double-forked bar composed of top and bottom plates of insulating material such as vulcanized fiber. Between the opposite pairs of arms on said holder are mounted a pair of circular copper contact disks 44 and 45 centrally apertured to receive vertical retaining screws 46 and loosely mounted between conical washers 47 which surround said screws so that the disks can tip slightly to seat properly on the fixed contacts and also turn to bring fresh portions of their surface into action. Both the upper and the lower surfaces of the disk 45 are utilized for electrical contact, but the lower surface only of the disk 44 is so utilized, its upper surface being covered by an insulating disk 48 of mica or fiber.

Disk 44 in its depressed position coacts on one side of the casing with the previously-mentioned copper contact member 29, and on the opposite side with a U-shaped copper contact member 49 riveted to the casing by a stem 50 and electrically separated therefrom by mica or other insulating material 51. A stem extending forwardly from member 49 through an insulator 52 is attached to a lead strap 53 which is burned to the negative terminal 19 of the cell 11. Said terminal 19 acts as the post for connecting one of the external circuit conductors to the battery, the other external conductor being connected to the diagonally opposite or positive post 18. When the contact disk 44 is raised to bring its insulating disk 48 against the upper legs of the fixed contacts 29 and 49, said upper legs act merely as stops to maintain this end of the movable contact assembly at the same level as the opposite end.

The contact disk 45 in its depressed position coacts on one side of the casing 26 with a U-shaped copper contact member 54, which is insulated from the casing by mica or other non-conductive material 55, and which has a stem extending through an insulator 56 to one end of a lead strap 57 whose opposite end is burned to the positive terminal 15 of cell 11. On the opposite side of the casing from said member 54 is located an L-shaped copper contact member 58 insulated from the casing by mica or other non-conductive material 59 and having a stem extending through an insulator 60 to one end of a lead strap 61 whose other end is burned to the positive terminal 16 of cell 12. Above the member 58 is located a copper contact member 62 electrically connected with the switch casing 26 and secured thereto by a screw 63 whose head is covered over with lead after the screw is in place. As will be seen in Fig. 1, the straps or conductors 28 and 53 extend partly across the top of the battery between the usual vent and filling plugs of the cells 11 and 12, represented by the central circles. They and the straps or conductors 57 and 61, all of which are fused to their respective cell terminals, preferably constitute the sole mechanical means for fixing the switch assembly on the battery.

In Fig. 2 the casing 26 and the conductors 28, 53, 57 and 61 are represented as wires, the fixed contacts are shown conventionally and the two contacts 58 and 62 and the legs of contact 54 are offset to bring the lower parts into view. The positive battery terminal 18 is connected by a wire 64 with a ground 65, such as the automobile frame, and a wire 66 connected with the negative battery terminal 19 leads from the usual charging, starting, lighting and ignition devices of the automobile, this external circuit being in part represented by the members 64, 65 and 66. A wire 67 from the binding post of the switch-operating or relay magnet bobbin 31 leads to the ground 65 through a switch 68, which may be a push button in any location convenient to the driver.

In the operation of my invention, the armature members 39 and 41 and their connected movable contacts 44 and 45 are biased by the action of gravity and the spring 40 to a depressed position in which disk 44 bridges the two fixed contacts 29 and 49, thereby connecting the two negative terminals 19, 20, while the disk 45 connects the fixed contacts 58 with the lower leg of fixed contact 54, thereby connecting the two positive terminals 15, 16. Hence the two cells 11 and 12 are connected in multiple or parallel and act as a single cell in series with the other two cells 13 and 14, the direction of current flow being indicated by full-line arrows in Fig. 2. Having twice the capacity of cells 13 and 14, this double cell 11, 12 will charge and discharge at half the rate of the latter, and it is found in practice that all four cells tend to retain approximately the same degree of charge.

For ordinary starts in moderate or warm weather or when the engine is warm, the battery may be used as an ordinary three-cell battery giving approximately six volts potential. When, however, the engine is cold and stiff and the battery voltage more or less reduced by low temperature, the driver has only to close the switch 68, thereby energizing the magnet bobbin 31 and causing its armature members 39 and 41 to be raised, thus opening the circuit across the contacts 29 and 49 as well as that across the contacts 54 and 58 and establishing a circuit across the contacts 54 and 62 as indicated by the broken-line arrows in Fig. 2. The negative terminals 19 and 20 of the cells 11 and 12 are thereby disconnected, the positive terminals 15 and 16 are also disconnected and the positive terminal 15 of cell 11 is connected to the negative terminal 20 of cell 12. All four cells will thereby be connected in series and additional power obtained through increased voltage and wattage to spin the engine and produce a hotter spark where battery ignition is employed, thus insuring a quick and satisfactory start, where, under similar conditions, the three-cell battery would often fail and become exhausted in the attempt to bring about a start.

Since the counter electromotive force of the starting motor at its engine turning speeds is very small and its electrical resistance remains practically constant, the power or wattage varies substantially as the square of the actual voltage, according to the formula $W=E^2/R$. The squares of the maximum voltages of 4-cell and 3-cell series batteries are in the ratio of 64 to 36, the difference being 28 or a maximum increase in power for the 4-cell as compared with the 3-cell of 77.7%, at low discharge. Even at a very high discharge rate the power increase is more than 50%. For example, at 300 amperes the 4-cell pressure drops to about 5 volts and the 3-cell to 4 volts or less, the squares being 25 and 16 respectively and the difference of the squares being 9, or an increase over 16 or 56.2%. This effect is contrary to what seems to be the universal opinion of numerous persons skilled in the art to whom the question has been put, who have answered that the power increase which should be expected from adding an extra cell to the ordinary 6-volt battry is one-third or 33⅓%.

Thus I am enabled to obtain, out of substantially the same total plate surface, greatly improved starting results, particularly in cold climates. While theoretically the ampere-hour capacity is reduced by employing a smaller number of plates per cell in all of the cells for an emergency start and in some of them for an ordinary start, in practice it is found that because of the quicker starts obtained and the faster charging of the smaller cells, coupled with the greater capacity of the two cells 11 and 12 when in multiple, the actual number of starts obtainable is as great as or greater than with ordinary three-cell batteries of approximately the same total plate surface, and starting is rendered much more certain.

The form of embodiment may be varied without departing from the scope of my invention as defined in the claims, and I do not limit myself to the use of only one extra cell, since the same or substantially the same ratio may be maintained for higher-voltage systems by using a greater number of cells in both the main group and the sub-group, or this ratio could be changed if desired.

I claim:

1. A 6–8 volt, four-cell engine-starting and lighting battery for automobiles, adapted for charging at substantially 6 volts and having two cells permanently connected in series with each other and with the other two which are connectible in series or parallel, in combination with a switch apparatus biased to connect said other two cells normally in parallel and having manually controllable means for connecting them in series to deliver a maximum of substantially 8 volts.

2. A portable storage battery and switch unit comprising a group of cells fixedly united in a row and each having the usual filling and vent plug, and a switch device fixed in position over one of the end cells and the next adjacent cell in said row and having means for connecting said two cells alternatively in parallel and in series, said means including a pair of conductors passing between the filling and vent plugs of said end cell and adjacent cell and fixedly connecting the switch device with terminals of said cells having the same polarity.

3. A portable storage battery and switch unit including a unitary block of cells of which the greater number are permanently connected in series, a switch device located on top of said block and including internal switch parts for connecting an additional cell of said block alternatively in parallel and in series with its neighbor, and a casing enclosing said parts and having integral external electrical connections with the terminals of the last-said two cells, whereby said device is permanently associated with the cell block.

4. The combination of a portable group of storage cells, and a switch device mounted thereon and including a casing sealed against the entrance of battery acid, and fixed and movable contacts within said casing for connecting certain of said cells alternatively in parallel and in series.

5. The combination of a group of storage cells, fixed and movable switch contacts associated therewith for connecting certain of said cells alternatively in parallel and in series, an electromagnet for operating the movable contacts, and an acid-proof casing enclosing said switch contacts and said electro-magnet and permanently mounted in a unitary structure with the cell group.

6. The combination of a group of storage cells including two adjoining cells each having projecting positive and negative terminals, and a switch device mounted on top of said group for connecting said two cells alternatively in parallel and in series, said device having a casing and external electrical conductors permanently and fixedly connecting said casing in a unitary structure with the respective terminals of said two cells.

7. The combination of a multi-cell storage battery, and a switch device mounted on and permanently associated in a unitary structure therewith for connecting certain of the battery cells alternatively in parallel and in series and having an operating magnet with a metallic outer casing included in circuit with the battery.

LUTHER M. PATTERSON, Jr.